US010517162B2

(12) United States Patent
Miura

(10) Patent No.: US 10,517,162 B2
(45) Date of Patent: Dec. 24, 2019

(54) LIGHTING SYSTEM AND COMMUNICATION TERMINAL

(71) Applicant: Panasonic Intellectual Property Management Co., Ltd., Osaka (JP)

(72) Inventor: Kei Miura, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/058,421

(22) Filed: Aug. 8, 2018

(65) Prior Publication Data

US 2019/0053357 A1    Feb. 14, 2019

(30) Foreign Application Priority Data

Aug. 14, 2017 (JP) .................. 2017-156332

(51) Int. Cl.
*H05B 37/02* (2006.01)
*H05B 33/08* (2006.01)

(52) U.S. Cl.
CPC ..... *H05B 37/0272* (2013.01); *H05B 33/0845* (2013.01)

(58) Field of Classification Search
CPC ............ H05B 37/0272; H05B 33/0803; H05B 33/0869; H05B 33/08; H05B 33/0845; H05B 33/0872; H05B 33/0893; H05B 37/02; H05B 37/034; H04W 12/06; H04W 4/80; H04W 84/12; H04W 88/16; H04W 80/02; H04W 84/18; H04W 4/005; H04W 4/70

USPC .................. 315/152, 307; 398/118
See application file for complete search history.

(56) References Cited

U.S. PATENT DOCUMENTS

| 2013/0063042 | A1* | 3/2013 | Bora | H05B 33/0863 315/292 |
| 2013/0221852 | A1* | 8/2013 | Bowers | H05B 33/0863 315/131 |
| 2014/0103819 | A1* | 4/2014 | Mohan | H05B 37/0254 315/159 |
| 2014/0167621 | A1* | 6/2014 | Trott | H05B 37/0218 315/154 |
| 2015/0012233 | A1* | 1/2015 | Mizuta | H04M 11/002 702/62 |
| 2015/0076991 | A1* | 3/2015 | Yamamoto | H05B 37/02 315/153 |
| 2015/0334811 | A1* | 11/2015 | So | H05B 37/02 315/152 |

FOREIGN PATENT DOCUMENTS

| JP | H11-214179 A | 8/1999 |
| JP | 2007-287682 A | 11/2007 |

(Continued)

*Primary Examiner* — Wei (Victor) Y Chan
(74) *Attorney, Agent, or Firm* — McDermott Will & Emery LLP

(57) ABSTRACT

A lighting system includes: a luminaire; a brightness sensor that controls the luminaire via wireless communication and detects brightness of the luminaire; a controller that performs control of the luminaire via the brightness sensor; and an operation terminal. The operation terminal wirelessly transmits setting information related to the control of the luminaire to the brightness sensor, and the brightness sensor relays the setting information to the controller via wired communication.

15 Claims, 3 Drawing Sheets

(56) References Cited

FOREIGN PATENT DOCUMENTS

| | | |
|---|---|---|
| JP | 2009-289476 A | 12/2009 |
| JP | 2009-295399 A | 12/2009 |
| JP | 2013-008703 A | 1/2013 |
| JP | 2015-230757 A | 12/2015 |
| JP | 2016-152124 A | 8/2016 |
| JP | 2016-177985 A | 10/2016 |

\* cited by examiner

LIGHTING SYSTEM AND COMMUNICATION TERMINAL

CROSS REFERENCE TO RELATED APPLICATION

This application claims the benefit of priority of Japanese Patent Application Number 2017-156332 filed on Aug. 14, 2017, the entire content of which is hereby incorporated by reference.

BACKGROUND

1. Technical Field

The present disclosure relates to a lighting system for controlling a luminaire, and a communication terminal.

2. Description of the Related Art

Conventionally, a lighting system including: a luminaire; a brightness sensor that is used for dimming control of the luminaire and detects the brightness of the luminaire; a controller that performs control of the luminaire; and an operation terminal has been disclosed (see reference, for example, to Japanese Unexamined Patent Application Publication No. 2015-230757). In the aforementioned lighting system, the operation terminal and the controller, for example, are capable of wireless communication (using, e.g., WiFi®), and setting information related to the control of the luminaire is transmitted from the operation terminal to the controller. This enables the controller to perform control such as dimming control of the luminaire.

SUMMARY

Wireless communication between an operation terminal and a controller, however, has a limitation in terms of distance, and the problem is that the transmission of signals from the operation terminal to the controller fails when the aforementioned lighting system is applied to a building whose dimensions exceed a certain size. To address this problem, it is conceivable to install plural controllers so that an operation terminal and the controllers are able to communicate in the entire area where the lighting system is applied. This, however, causes an increase in the cost of the lighting system and the waste of radio resources.

In view of the above, the present disclosure has an object to provide a lighting system and a communication terminal with which signals can be easily transmitted from an operation terminal to a controller even in a building whose dimensions exceed a certain size.

A lighting system according to one aspect of the present disclosure includes a luminaire; a brightness sensor that controls the luminaire via wireless communication and detects brightness of the luminaire; a controller that performs control of the luminaire via the brightness sensor; and an operation terminal. The operation terminal wirelessly transmits setting information related to the control of the luminaire to the brightness sensor, and the brightness sensor relays the setting information to the controller via wired communication.

A communication terminal according to one aspect of the present disclosure is a communication terminal to be communicably connected to an operation terminal in a lighting system including: a luminaire; a brightness sensor that controls the luminaire via wireless communication and detects brightness of the luminaire; a controller that performs control of the luminaire via the brightness sensor; and the operation terminal. The communication terminal includes: a receiver that receives setting information related to the control of the luminaire from the operation terminal when the communication terminal is connected to the operation terminal; a storage that stores the setting information received by the receiver; and a transmitter that wirelessly transmits the setting information stored by the storage to the brightness sensor, for relaying the setting information to the controller by the brightness sensor via wired communication. The operation terminal and the communication terminal are disconnected from each other after all of the setting information has been stored in the storage.

With the lighting system and the communication terminal according to one aspect of the present disclosure, signals can be easily transmitted from an operation terminal to a controller even in a building whose dimensions exceed a certain size.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENTS

[How the Present Disclosure has been Conceived]

Figure 1:
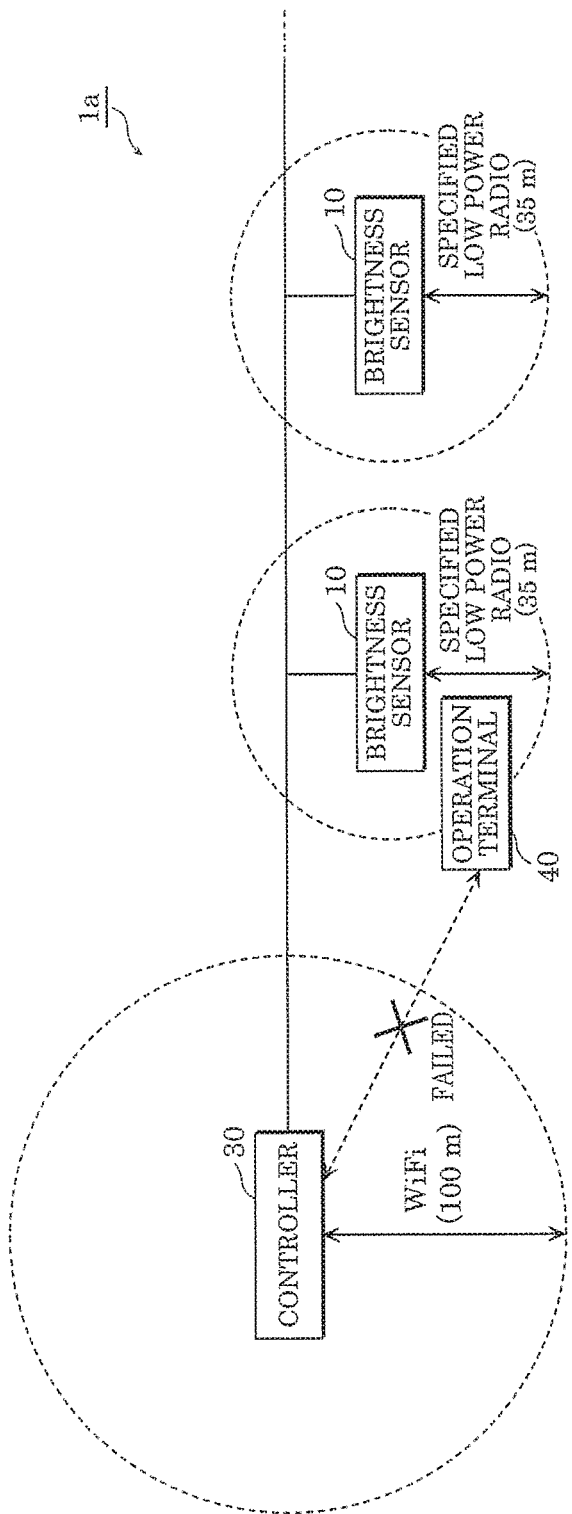
FIG. 1 is a diagram for explaining how the present disclosure has been conceived.

FIG. 1 is a diagram for explaining how the present disclosure has been conceived. First, how the present disclosure has been conceived will be described with reference to FIG. 1.

In lighting system 1a, the dimming of a luminaire is controlled according to the brightness of the luminaire (more specifically, the luminance of a floor radiated by the luminaire). Lighting system 1a includes a luminaire (not shown in FIG. 1), brightness sensor 10 that detects the brightness of the luminaire, controller 30 that performs control the luminaire, and operation terminal 40. Brightness sensor 10 is used for the dimming control of the luminaire. In lighting system 1a, operation terminal 40 wirelessly transmits (using, e.g., WiFi®) setting information related to the control of the luminaire to controller 30. This enables controller 30 to perform control such as the dimming control of the luminaire. Note that the control of the luminaire includes dimming control of the luminaire, control of color temperature, ON/OFF control, etc.

The wireless communication between operation terminal 40 and controller 30, however, has a limitation in terms of distance, and a distance that enables wireless communication using WiFi, for example, is approximately 100 m. The problem is that the transmission of signals from operation terminal 40 to controller 30 fails when lighting system 1a is applied to a building whose dimensions exceed a certain size. To address this problem, it is conceivable to install plural controllers 30 so that operation terminal 40 and controllers 30 are able to communicate in the entire area where lighting system 1a is applied. This, however, results in an increase in the cost of lighting system 1a and the waste of radio resources. It is also conceivable that operation terminal 40 is relocated in a place within the range that enables wireless communication with controller 30, and then setting information is transmitted from operation terminal 40 to controller 30. Nevertheless, the content of the setting information related to the control of the luminaire changes depending on, for example, how the luminaire is installed. Therefore, there is a demand for transmitting setting information while actually looking at the luminaire on the spot where the luminaire is installed.

In view of the above, the inventors of the present disclosure focused their attentions on the wireless connection between the luminaire and brightness sensor 10 and the dimming control of the luminaire and other kinds of control that are performed via brightness sensor 10. Thus, the inventors discovered the application of the wireless communication used between brightness sensor 10 and the luminaire to the transmission of signals from operation terminal 40 to controller 30.

The following describes in detail exemplary embodiments according to the present disclosure with reference to the drawings. Note that each of the embodiments described below is merely one specific example of the present disclosure. Accordingly, the numerical values, elements, arrangement and connection of the elements, etc. indicated in the following embodiments are given merely by way of illustrations, and are not intended to limit the scope of the present disclosure. Therefore, among the elements in the following embodiments, those not recited in any one of the independent claims defining the broadest concepts of the present disclosure are described as optional elements.

Note also that the figures are schematic illustrations and are not necessarily precise depictions. Moreover, in the figures, elements that are essentially the same share like reference signs.

Embodiment

Figure 2:
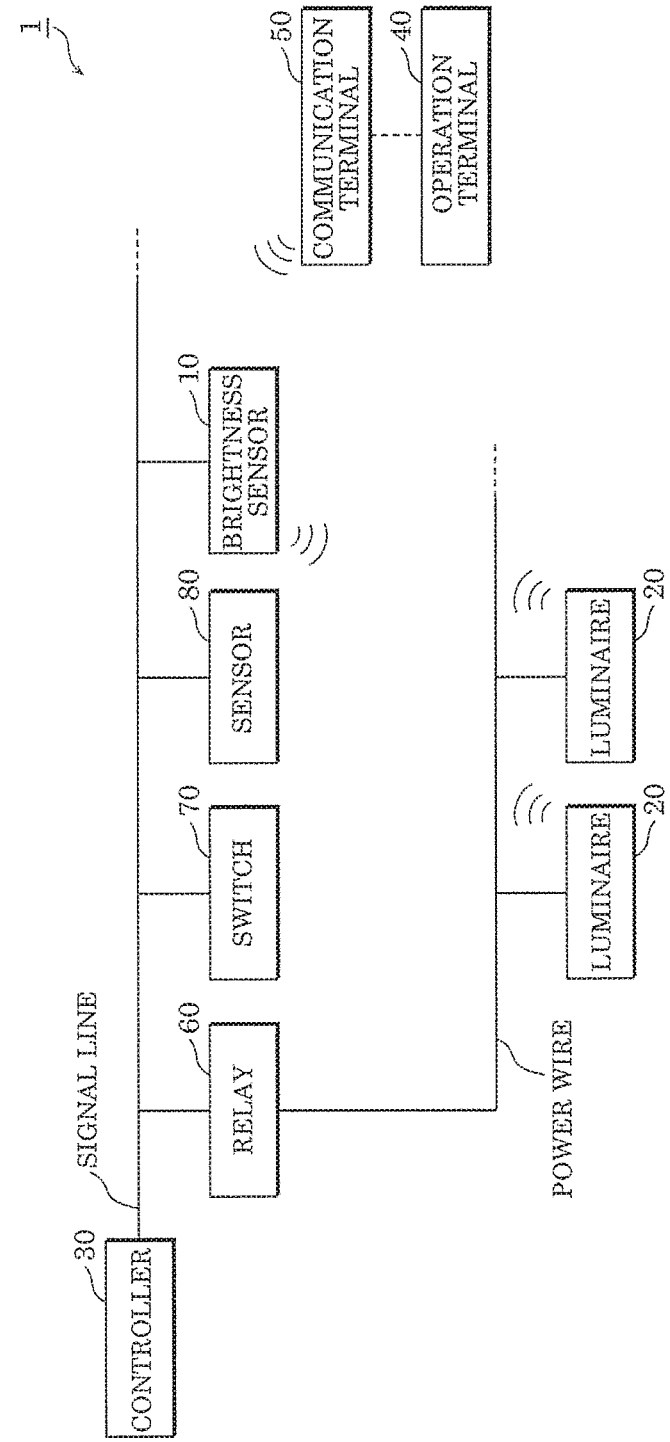
FIG. 2 is a block diagram illustrating an example of a lighting system according to an embodiment.
Figure 3:
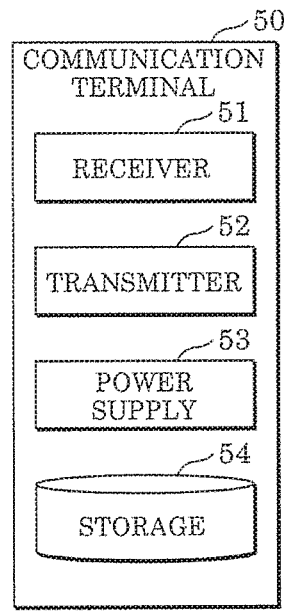
FIG. 3 is a block diagram illustrating an example of a communication terminal according to the embodiment.

The following describes an embodiment with reference to FIG. 2 and FIG. 3.
[Lighting System Configuration]
FIG. 2 is a block diagram illustrating an example of lighting system 1 according to the embodiment.

Lighting system 1 is a system for performing control such as the dimming control of a luminaire, and is applicable to a building whose dimensions exceed a certain size, e.g., a building having plural floors. Lighting system 1 includes luminaire 20, brightness sensor 10 that is used for the dimming control of luminaire 20 and detects the brightness of luminaire 20, controller 30 that controls luminaire 20, and operation terminal 40. In addition, lighting system 1 further includes communication terminal 50 to be connected to operation terminal 40, relay 60 that switches between on and off of power supply to luminaire 20, switch 70 for controlling luminaire 20, and sensor 80.

Brightness sensor 10 is used for the dimming control of luminaire 20 and is a sensor that detects the brightness of luminaire 20. For example, brightness sensor 10 is installed in the vicinity of a location where luminaire 20 is installed, and detects the brightness of luminaire 20 by detecting, for example, the luminance of a floor radiated by luminaire 20. The dimming of luminaire 20 is controlled, for example, so that the brightness detected by brightness sensor 10 indicates a preset value that is determined in advance. More specifically, when the detected brightness is higher than the preset brightness value, the dimming rate of luminaire 20 is decreased, and when the detected brightness is lower than the preset brightness value, the dimming rate of luminaire 20 is increased. The preset brightness value is, for example, stored in brightness sensor 10, and brightness sensor 10 controls the dimming of luminaire 20 according to the detected brightness and the preset brightness value stored in brightness sensor 10. Brightness sensor 10 and luminaire 20 are communicably connected for wireless communication, and brightness sensor 10 controls the dimming of luminaire 20 by transmitting a control signal related to dimming control to luminaire 20. Specified low power radio that uses a frequency in the 920 MHz band or in the 916-928 MHz band, for example, is used for the communication between brightness sensor 10 and luminaire 20. Specified low power radio is defined in item 2 of paragraph 4 of Article 6 of the enforcement regulations of the ordinance of the Ministry of Internal Affairs and Communications of Japan. In the specified low-power wireless communication, a radio communication is carried out in specified ranges of frequency, with low power which is less than or equal to 10 mW, for example. The distance that enables specified low-power wireless communication is about 35 m and this covers a distance that enables the detection of the brightness of brightness sensor 10. Stated differently, luminaire 20 that detects the brightness of brightness sensor 10 is installed within the distance enabling such wireless communication. As has been described above, lighting system 1 is applicable to a building whose dimensions exceed a certain size, and therefore, it is difficult to detect, with one brightness sensor 10, the brightnesses of all of luminaires 20 installed in the building. Accordingly, brightness sensor 10 is installed, for example, in each predetermined area.

Note that a preset brightness value may be stored in controller 30, and brightness sensor 10 may transmit information on the detected brightness of luminaire 20 to controller 30 and control the dimming of luminaire 20 according to the received information and the preset brightness value stored in controller 30. In this case, controller 30 transmits the control signal related to dimming control to brightness sensor 10, and brightness sensor 10 controls the dimming of luminaire 20 by further transmitting, to luminaire 20, the control signal received from controller 30.

Luminaire 20 includes a light source and is a device capable of ON/OFF switching and change in dimming rate (brightness). As has been described above, lighting system 1 is applicable to a building whose dimensions exceed a certain size, and therefore, plural luminaires 20 are installed in the building. For example, brightness sensor 10 and each of luminaires 20, which are installed in the predetermined area as mentioned above, are associated with each other, and the association is carried out for each predetermined area. Accordingly, it is possible to control, for each predetermined area, the dimming of luminaire 20 according to the brightness of luminaire 20. In addition, luminaire 20 is supplied with power via relay 60, and the power supply to luminaire 20 can be turned off for each predetermined area.

Controller 30 is a controller that performs the control of luminaire 20 and is so called a main controller in lighting system 1. Controller 30 stores setting information that is related to the control of luminaire 20 and has been transmitted from operation terminal 40, and controls luminaire 20 according to the stored setting information. The setting information will be mentioned later on.

Operation terminal 40 is, for example, a portable terminal such as a smart phone or a tablet, and wirelessly transmits setting information to brightness sensor 10. More specifically, operation terminal 40 wirelessly transmits setting information to brightness sensor 10 via communication terminal 50 which will be mentioned later. The user carries out setting related to the control of luminaire 20, using operation terminal 40. The same wireless communication method as used for the communication between brightness sensor 10 and luminaire 20 is used for communication between operation terminal 40 and brightness sensor 10 (more specifically, communication between communication terminal 50 and brightness sensor 10). To be more specific, specified low-power wireless communication is used. Brightness sensor 10 relays the received setting information to controller 30 via wired communication. Thus, the setting information is firstly transmitted to brightness sensor 10 and then transmitted from brightness sensor 10 to controller 30 instead of being directly transmitted from operation terminal 40 to controller 30.

Communication terminal 50 is a communication interface to be communicably connected to operation terminal 40 and has a communication function used, for example, in specified low-power wireless communication. A portable terminal such as a smart phone or a tablet, which is used as operation terminal 40, does not have such a specified low-power wireless communication function, in some cases. It is therefore via communication terminal 50 having a specified low-power wireless communication function that operation terminal 40 and brightness sensor 10 become capable of wireless communication. Communication terminal 50 and operation terminal 40 are communicably connected, for example, by Bluetooth® Low Energy (BLE). Moreover, communication terminal 50 may have a universal serial bus (USB) connector and communication terminal 50 and operation terminal 40 may be communicably connected via the USB connector, though the details of the configuration of communication terminal 50 will be mentioned later. Furthermore, communication terminal 50 and operation terminal 40 may be communicably connected by means of infrared-rays.

Relay 60 is a switch that switches between on and off of power supply to luminaire 20. Relay 60 switches on and off of the power supply to luminaire 20, according to an instruction from controller 30, for example.

Switch 70 is, for example, a wall switch provided on a wall of a building, and has buttons for operating desired luminaire 20. For example, each button is associated with luminaire 20 targeted for operation and an instruction for causing that luminaire 20 to operate (e.g., operate at the dimming rate of 80%). Moreover, switch 70 may include a button to continuously increase the dimming rate of desired luminaire 20 while the button is being pressed down and a button to continuously decrease the dimming rate of desired luminaire 20 while the button is being pressed down.

Sensor 80 is, for example, a human detection sensor though not specifically restricted to such, and may be any kind of sensor as far as the sensor is involved with the control of luminaire 20. For example, luminaire 20 is turned off when sensor 80 (human detection sensor) no longer detects a person.

[Setting Information]

Next, the following describes setting information that is related to the control of luminaire 20 and has been transmitted to controller 30.

The setting information includes, for example, association information in which brightness sensor 10 and luminaire 20 are associated with each other, and controller 30 refers to the association information when controlling desired luminaire 20 among luminaires 20. More specifically, controller 30 gives, based on the association information, an instruction to brightness sensor 10 associated with desired luminaire 20 so that desired luminaire 20 carries out a desired operation.

Moreover, the setting information includes, for example, information on the grouping of luminaires 20, and controller 30 refers to the information on the grouping when controlling luminaires 20 on a group-by-group basis.

Further, the setting information includes, for example, information on a scheduling operation that changes with time the dimming rate of luminaire 20, for example, and controller 30 refers to the information on the scheduling, operation when operating luminaire 20 as has been scheduled.

What is more, the setting information includes, for example, association information in which switch 70 and luminaire 20 are associated with each other. When a button included in switch 70 is pressed down, for example, controller 30 controls luminaire 20 associated with the button, based on a control instruction associated with the button.

Furthermore, the setting information includes, for example, association information in which switch 80 and luminaire 20 are associated with each other. Sensor 80 is, for example, a human detection sensor that detects a person in the vicinity of luminaire 20 associated with sensor 80. When no person is present in the vicinity of that luminaire 20, controller 30 causes that luminaire 20 to extinguish light, and when a person is present, controller 30 causes that luminaire 20 to emit light.

Thus, the setting information includes various types of information, and the data size of the setting information is expected to increase in the future because the setting information may include information other than those described above.

[Configuration of Communication Terminal]

Next, the configuration of communication terminal 50 will be described with reference to FIG. 3 and FIG. 4.

FIG. 3 is a block diagram illustrating an example of communication terminal 50 according to the embodiment.

Communication terminal 50 is a computer that includes a processor (microprocessor), a communication circuit, a user interface, etc., and includes receiver 51, transmitter 52, power supply 53, and storage 54. Storage 54 is a ROM, a RAM, or the like, and may include, for example, a non-transitory memory. The user interface includes, for example, an input device such as a button. The processor controls receiver 51, transmitter 52, power supply 53, etc., by executing a program stored in storage 54. Communication terminal 50 is, for example, a palm-sized and portable terminal. Communication terminal 50 includes power supply 53 that receives power from operation terminal 40 and does not need to have batteries, which makes communication terminal 50 light in weight and easy to carry. It should be noted that, in the present embodiment, communication terminal 50 has batteries rechargeable by power supply from operation terminal 40, which is to be mentioned later on.

Receiver 51 receives setting information from operation terminal 40 when communication terminal 50 is connected to operation terminal 40. Storage 54 stores the setting information received by receiver 51. Then, transmitter 52 wirelessly transmits the setting information stored by storage 54 to brightness sensor 10, for relaying the setting information to controller 30 by brightness sensor 10 via wired communication. Operation terminal 40 and communication terminal 50 are disconnected from each other after all of setting information has been stored in storage 54. Note that even though operation terminal 40 and communication terminal 50 are disconnected from each other, communication terminal 50 is capable of wirelessly transmitting the setting information stored in storage 54.

Moreover, in the case where a transmission error occurs in the wireless transmission of the setting information from transmitter 52 to brightness sensor 10, transmitter 52 retransmits the setting information. Even when operation terminal 40 and communication terminal 50 are disconnected from each other, setting information is stored in storage 54. Therefore, communication terminal 50 is capable of retransmitting the setting information even when a transmission error occurs.

Figure 4:
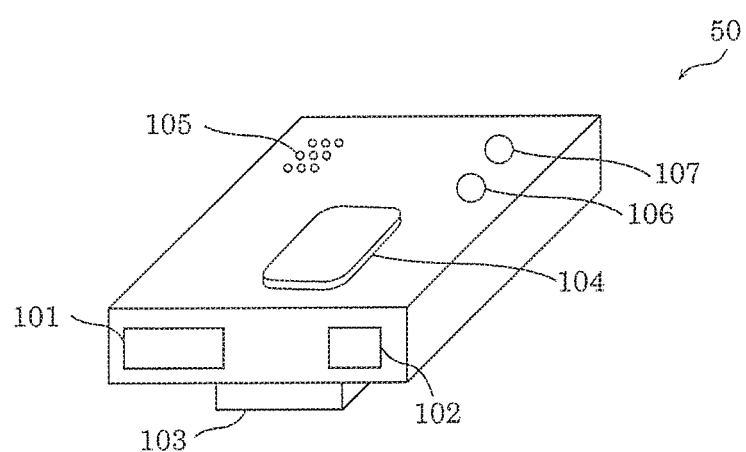
FIG. 4 is an external view illustrating an example of the communication terminal according to the embodiment.

FIG. 4 is an external view illustrating an example of communication terminal 50 according to the embodiment.

Communication terminal 50 includes USB connector 101, wired transmission connector 102, battery box 103, transmission button 104, speaker 105, red lamp 106, and green lamp 107.

USB connector 101 is a connector that enables connection between a personal computer (PC) or the like and communication terminal 50. Communication terminal 50 may, for example, obtain setting information from a PC or the like via USB connector 101, and correction, update, etc. of the setting information may be carried out by the PC. Moreover, USB connector 101 may be a connector that enables connection between communication terminal 50 and operation terminal 40. In this case, receiver 51 may be realized by USB connector 101. In other words, communication terminal 50 may obtain setting information from operation terminal 40 via USB connector 101. Furthermore, power supply 53 may be realized by USB connector 101. In other words, communication terminal 50 may receive power from operation terminal 40 via USB connector 101.

Wired transmission connector 102 is a connector that enables connection between controller 30 and communication terminal 50. Setting information is wirelessly transmitted from communication terminal 50 to brightness sensor 10, and is relayed from brightness sensor 10 to controller 30 via wired communication. The setting information, however, may be directly transmitted from communication terminal 50 to controller 30 via wired transmission connector 102, for example.

Batteries for operating communication terminal 50 are housed in battery box 103. The batteries may be dry-cell batteries or rechargeable batteries to be recharged by power supply from operation terminal 40.

Transmission button 104 is a button for starting the transmission of the setting information stored in storage 54 to brightness sensor 10. Thus, the transmission of the setting information can be started at a timing desired by the user.

Speaker 105, for example, outputs a sound for informing those around speaker 105, when communication terminal 50 is lost. For, it takes time to transmit setting information from communication terminal 50 to controller 30 via brightness sensor 10 in some cases, and during the transmission of the setting information, communication terminal 50 may be left unattended and has a risk of being lost, which will be mentioned later.

Red lamp 106 is a lamp for informing the user of, for example, an error during communication for the transmission of setting information or decrease in the remaining battery level. Green lamp 107 is a lamp for informing the user, for example, that communication terminal 50 is in the state of communication for the transmission of setting information or that the communication is completed.

Note that communication terminal 50 may have an infrared-ray communication function or a function to control the dimming of luminaire 20 based on infrared-ray communication. Moreover, communication terminal 50 may have a power button and may turn the power off when not in use and thereby reduce unnecessary power consumption.

[Advantageous Effects Etc.]

As has been described above, lighting system 1 according to the present embodiment includes: luminaire 20; brightness sensor 10 that controls luminaire 20 via wireless communication and detects the brightness of luminaire 20; controller 30 that performs control of luminaire 20 via brightness sensor 10; and operation terminal 40. Operation terminal 40 wirelessly transmits setting information related to the control of luminaire 20 to brightness sensor 10, and brightness sensor 10 relays the setting information to controller 30 via wired communication.

In a building whose dimensions exceed a certain size, it is difficult, in some cases, due to a limitation in terms of distance required for wireless communication for operation terminal 40 to wirelessly transmit, in a direct manner, the setting information related to the control of luminaire 20 to controller 30. In contrast, according to the present disclosure, setting information is not wirelessly transmitted, in a direct manner, from operation terminal 40 to controller 30, but is wirelessly transmitted to brightness sensor 10 at first, and then relayed from brightness sensor 10 to controller 30 via wired communication. With this, signals can be easily transmitted, from operation terminal 40 to controller 30 even in a building whose dimensions exceed a certain size. Since the content of the setting information related to the control of luminaire 20 changes depending, for example, on how luminaire 20 is installed, there is a demand for transmitting the setting information while actually looking at luminaire 20 on the spot where luminaire 20 is installed. This demand can be satisfied because the setting information is wirelessly transmitted to brightness sensor 10 that may be installed in the vicinity of luminaire 20.

In addition, lighting system 1 may further include communication terminal 50 to be communicably connected to operation terminal 40. Communication terminal 50 may include: receiver 51 that receives setting information from operation terminal 40 when communication terminal 50 is connected to operation terminal 40; storage 54 that stores the setting information received by receiver 51; and transmitter 52 that wirelessly transmits the setting information stored by storage 54 to brightness sensor 10. Operation terminal 40 and communication terminal 50 may be disconnected after all of setting information has been stored in storage 54.

In the case where the data size of setting information is large or a speed of communication between operation terminal 40 and brightness sensor 10 is slow, it takes time to complete the transmission of the setting information in some cases. The setting information includes, for example, various types of information as has been described above, and the data size of the setting information is expected to increase in the future because the setting information may include information other than those described above. Moreover, in the case where specified low power radio is used for communication between operation terminal 40 and brightness sensor 10, for example, antenna power needs to be reduced and therefore the communication speed may be slowed down due to intermittent operation or any other reason.

In the case of using a portable terminal such as a smart phone or a tablet which the user normally uses as operation terminal 40, for example, the user cannot carry operation terminal 40 away from the vicinity of brightness sensor 10, and thus, the user cannot leave the vicinity of brightness sensor 10. In contrast, according to the present embodiment, setting information is transmitted from operation terminal 40 to communication terminal 50, and subsequently, operation terminal 40 and communication terminal 50 are disconnected from each other after the setting information has been stored in communication terminal 50, for example. Accordingly, the user can carry operation terminal 40 away from the vicinity of brightness sensor 10 while allowing communication terminal 50 to transmit the setting information to brightness sensor 10.

When a transmission error occurs in the wireless transmission of setting information from transmitter 52 to brightness sensor 10, transmitter 52 may retransmit the setting information.

Thus, transmitter 52 is capable of securely transmitting the setting information.

Furthermore, communication terminal 50 may further include power supply 53 that receives power from operation terminal 40.

As has been described above, lighting system 1 is applicable to a building whose dimensions exceed a certain size, and therefore, it is difficult to detect, with one brightness sensor 10, the brightness values of all of luminaires 20 installed in the building. Accordingly, brightness sensor 10 is installed in each predetermined area. It is therefore assumed that the setting information, which is related to the control of luminaire 20 whose brightness is to be detected by brightness sensor 10 installed in each predetermined area, is transmitted to this brightness sensor 10. In this case, it is conceivable that the user carries communication terminal 50 with him/her to transmit setting information in each predetermined area. Therefore, with communication terminal 50 having power supply 53 that receives power from operation terminal 40, communication terminal 50 does not need batteries. This allows the weight of communication terminal 50 to be lighter and increases efficiency in the operation.

The setting information may include association information in which brightness sensor 10 and luminaire 20 are associated with each other, and controller 30 may refer to the association information when controlling luminaire 20.

With this, controller 30 is capable of giving, based on the association information, an instruction to brightness sensor 10 associated with desired luminaire 20 so that desired luminaire 20 carries out a desired operation.

Moreover, lighting system 1 may further include switch 70 for controlling luminaire 20, and the setting information may include association information in which switch 70 and luminaire 20 are associated with each other. Controller 30 may control luminaire 20 associated with switch 70 based on a control instruction associated with switch 70.

With this, when a button included in switch 70 is pressed down, controller 30 is capable of controlling luminaire 20 associated with the button, based on a control instruction associated with the button.

Furthermore, communication terminal 50 according to the present embodiment is a communication terminal to be communicably connected to operation terminal 40 in lighting system 1 including: luminaire 20; brightness sensor 10 that controls luminaire 20 via wireless communication and detects the brightness of luminaire 20; controller 30 that performs control of luminaire 20 via brightness sensor 10; and operation terminal 40. Communication terminal 50 includes: receiver 51 that receives setting information related to the control of luminaire 20 from operation terminal 40 when communication terminal 50 is connected to operation terminal 40; storage 54 that stores the setting information received by receiver 51; and transmitter 52 that wirelessly transmits the setting information stored by storage 54 to brightness sensor 10, for relaying the setting information to controller 30 by brightness sensor 10 via wired communication. Operation terminal 40 and communication terminal 50 may be disconnected after all of setting information has been stored in storage 54.

Thus, it is possible to provide communication terminal 50 with which signals can be easily transmitted from operation terminal 40 to controller 30. Furthermore, the user can carry operation terminal 40 away from the vicinity of brightness sensor 10 while allowing communication terminal 50 to transmit setting information to brightness sensor 10.

Other Embodiments

Although lighting system 1 and communication terminal 50 according to the embodiment have been described so far, the present disclosure shall not be limited to the aforementioned embodiment.

In the aforementioned embodiment, lighting system 1 includes, for example, relay 60, switch 70, and sensor 80, but may not include them.

In the aforementioned embodiment, communication terminal 50, for example, includes power supply 53 but may not include it.

Moreover, the present disclosure can be realized not only as lighting system 1 and communication terminal 50, but also as a method including the steps (processes) performed by each of the components included in lighting system 1 and communication terminal 50.

These steps may be executed, for example, by a computer (computer system). The present disclosure can be realized as a program for causing a computer to execute the steps included in such a method. Furthermore, the present disclosure can be realized as a non-transitory computer readable storage medium such as a CD-ROM in which the program is recorded.

In the case where the present disclosure is realized using a program (software), for example, each of the steps is executed by the program being executed using hardware resources such as a CPU, a memory, an input/output (I/O) circuit, etc. included in the computer. In other words, each of the steps is executed by the CPU obtaining data from the memory, I/O circuit, etc, and then computing, or outputting the computing result to the memory, I/O circuit, etc.

Each of the components included in lighting system 1 and communication terminal 50 according to the aforementioned embodiment may be realized as a dedicated or general-purpose circuit.

Each of the components included in lighting system 1 and communication terminal 50 according to the aforementioned embodiment may be realized as a large-scale integration (LSI) which is an integrated circuit (IC).

Further, each of the components included in the lighting system and the communication terminal according to the aforementioned embodiment to be realized as an integrated circuit is not limited to an LSI, and each of them may be realized as a dedicated circuit or a general-purpose processor. A field programmable gate array (FPGA) which can be programmed or a reconfigurable processor which can reconfigure the connection or setting of circuit cells inside an LSI may be used.

Furthermore, with the arrival of an integrated circuit technology that can replace LSIs owing to the advancement in a semiconductor technology or a different technology deriving from the semiconductor technology, it is natural that each of the components included in lighting system 1 and communication terminal 50 be integrated into circuits using that technology.

Forms obtained by various modifications to the foregoing embodiment that can be conceived by a person skilled in the art as well as forms realized by arbitrarily combining components and functions in the embodiment within the scope of the essence of the present disclosure are included in the present disclosure.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A lighting system comprising:
   a luminaire;
   a brightness sensor that controls the luminaire via wireless communication;
   a controller that performs control of the luminaire via the brightness sensor;
   an operation terminal; and
   a communication terminal, which is a physically separated terminal from the operation terminal, to be communicably and wirelessly connected to the operation terminal, wherein:
   the operation terminal wirelessly transmits setting information related to the control of the luminaire to the brightness sensor,
   the setting information is not directly transmitted to the controller,
   the brightness sensor relays the setting information to the controller via wired communication,
   the communication terminal includes:
      a receiver that receives the setting information from the operation terminal when the communication terminal is wirelessly connected to the operation terminal;
      a storage that stores the setting information received by the receiver; and
      a transmitter that wirelessly transmits the setting information stored in the storage to the brightness sensor, and
   a wireless communication between the operation terminal and the communication terminal is terminated after all of the setting information has been stored in the storage.

2. The lighting system according to claim 1, wherein the communication terminal transmits the setting information related to the control of the luminaire to the brightness sensor via specified low-power wireless communication that uses a frequency in a 920 MHz band and low power which is lower than or equal to 20 mW.

3. The lighting system according to claim 1, wherein the transmitter transmits, via specified low-power wireless communication that uses a frequency in a 920 MHz band and low power which is lower than or equal to 20 mW, the setting information stored in the storage to the brightness sensor.

4. The lighting system according to claim 1, wherein the transmitter retransmits the setting information when a transmission error occurs in the wireless transmission of the setting information from the transmitter to the brightness sensor.

5. The lighting system according to claim 1, wherein the setting information includes association information in which the brightness sensor and the luminaire are associated with each other, and
   the controller refers to the association information when controlling the luminaire.

6. The lighting system according to claim 5, wherein the controller is configured to perform the control of the luminaire via the brightness sensor based on the association information.

7. The lighting system according to claim 1, wherein the luminaire comprises a plurality of luminaires, and
   the setting information includes information on grouping of the plurality of luminaires, and
   the controller refers to the information on the grouping when controlling the plurality of luminaires on a per group basis.

8. The lighting system according to claim 1, wherein the setting information includes information on a scheduling operation of the luminaire, and
   the controller refers to the information on the scheduling operation when operating the luminaire as has been scheduled.

9. The lighting system according to claim 8, wherein the controller is configured to perform dimming control that changes with time the dimming rate of the luminaire based on the scheduling operation.

10. The lighting system according to claim 1, further comprising:
    a switch for controlling the luminaire, wherein
    the setting information includes association information in which the switch and the luminaire are associated with each other, and
    the controller controls the luminaire associated with the switch based on a control instruction associated with the switch.

11. A communication terminal to be communicably and wirelessly connected to an operation terminal, which is a physically separated terminal from the communication terminal, in a lighting system including: a luminaire; a brightness sensor that controls the luminaire via wireless communication; a controller that performs control of the luminaire via the brightness sensor; and the operation terminal, the communication terminal comprising:
    a receiver that receives setting information related to the control of the luminaire from the operation terminal when the communication terminal is wirelessly connected to the operation terminal;
    a storage that stores the setting information received by the receiver; and
    a transmitter that wirelessly transmits the setting information stored by the storage to the brightness sensor, for relaying the setting information to the controller by the brightness sensor via wired communication, wherein:
    the setting information is not directly transmitted to the controller, and
    the operation terminal and the communication terminal which has been wirelessly connected are disconnected from each other after all of the setting information has been stored in the storage.

12. A control method for controlling a communication terminal that is to be communicably and wirelessly connected to an operation terminal, which is a physically separated terminal from the communication terminal, in a lighting system including: a luminaire; a brightness sensor that controls the luminaire via wireless communication; a controller that performs control of the luminaire via the brightness sensor; and the operation terminal, the control method comprising:
- receiving setting information related to the control of the luminaire from the operation terminal after the communication terminal is wirelessly connected to the operation terminal;
- storing the setting information received;
- wirelessly transmitting the setting information stored to the brightness sensor, for relaying the setting information to the controller by the brightness sensor via wired communication; and
- terminating a wireless communication between the operation terminal and the communication terminal after all of setting information has been stored,
- wherein the setting information is not directly transmitted to the controller.

13. The lighting system according to claim 1, wherein the brightness sensor detects brightness of the luminaire.

14. The communication terminal according to claim 11, wherein the brightness sensor detects brightness of the luminaire.

15. The control method according to claim 12, wherein the brightness sensor detects brightness of the luminaire.

\* \* \* \* \*